United States Patent
Kellis et al.

(10) Patent No.: US 8,493,012 B2
(45) Date of Patent: Jul. 23, 2013

(54) PROTECTION RELAY, ELECTRICAL SWITCHING APPARATUS, AND SYSTEM FOR DETERMINING AND OUTPUTTING FAULT CURRENT AVAILABLE AT A LOAD AND INCIDENT ENERGY OR PERSONAL PROTECTIVE EQUIPMENT LEVEL OPERATIVELY ASSOCIATED THEREWITH

(75) Inventors: Joe M. Kellis, Weaverville, NC (US); Lawrence B. Farr, Asheville, NC (US)

(73) Assignee: Eaton Corporation, Cleveland, OH (US)

( * ) Notice: Subject to any disclaimer, the term of this patent is extended or adjusted under 35 U.S.C. 154(b) by 918 days.

(21) Appl. No.: 12/619,809

(22) Filed: Nov. 17, 2009

(65) Prior Publication Data

US 2011/0116196 A1 May 19, 2011

(51) Int. Cl.
*H02H 7/08* (2006.01)
*H02P 1/04* (2006.01)

(52) U.S. Cl.
USPC ............... 318/430; 318/650; 361/23; 361/30; 361/31

(58) Field of Classification Search
USPC ................ 318/650, 71, 400.12, 400.22, 430, 318/432, 434; 361/23, 29, 30, 31, 79
See application file for complete search history.

(56) References Cited

U.S. PATENT DOCUMENTS

| | | |
|---|---|---|
| 4,644,547 A | 2/1987 | Vercellotti et al. |
| 4,644,566 A | 2/1987 | Vercellotti et al. |
| 4,653,073 A | 3/1987 | Vercellotti et al. |
| 5,315,531 A | 5/1994 | Oravetz et al. |
| 5,548,523 A | 8/1996 | Wehrli, III et al. |
| 5,627,716 A | 5/1997 | Lagree et al. |
| 5,706,153 A * | 1/1998 | Innes et al. ...................... 361/31 |
| 5,815,364 A | 9/1998 | Hurley et al. |
| 6,055,145 A | 4/2000 | Lagree et al. |
| 7,526,392 B2 * | 4/2009 | Gasperi et al. .................. 702/60 |
| 7,598,751 B2 * | 10/2009 | Collins et al. .................. 324/649 |
| 7,612,972 B2 * | 11/2009 | Battani et al. ................... 361/42 |
| 7,671,606 B2 * | 3/2010 | Gasperi ......................... 324/652 |
| 2006/0241881 A1 * | 10/2006 | Gasperi et al. .................. 702/62 |
| 2007/0194942 A1 * | 8/2007 | Darr .............................. 340/635 |
| 2008/0204042 A1 * | 8/2008 | Gasperi et al. ................ 324/629 |
| 2008/0265912 A1 * | 10/2008 | Gasperi ......................... 324/652 |
| 2010/0023309 A1 * | 1/2010 | Radibratovic et al. .......... 703/18 |
| 2010/0026317 A1 * | 2/2010 | Collins et al. ................. 324/649 |
| 2012/0191439 A1 * | 7/2012 | Meagher et al. ................ 703/18 |

* cited by examiner

*Primary Examiner* — Eduardo Colon Santana
(74) *Attorney, Agent, or Firm* — Eckert Seamans Cherin & Mellott, LLC; Kirk D. Houser

(57) ABSTRACT

A protection relay for an electrical switching apparatus for a load includes a number of voltage sensors structured to sense voltage applied to the load, a number of current sensors structured to sense current flowing to the load, and a processor cooperating with the number of voltage sensors and the number of current sensors. The processor determines a fault current available at the load. An output cooperates with the processor. The output is structured to output the determined fault current and a number of: incident energy at the electrical switching apparatus, and a personal protective equipment level operatively associated with the electrical switching apparatus. The processor determines from the determined fault current the number of: the incident energy at the electrical switching apparatus, and the personal protective equipment level operatively associated with the electrical switching apparatus.

23 Claims, 4 Drawing Sheets

PROTECTION RELAY, ELECTRICAL SWITCHING APPARATUS, AND SYSTEM FOR DETERMINING AND OUTPUTTING FAULT CURRENT AVAILABLE AT A LOAD AND INCIDENT ENERGY OR PERSONAL PROTECTIVE EQUIPMENT LEVEL OPERATIVELY ASSOCIATED THEREWITH

BACKGROUND

1. Field

The disclosed concept pertains generally to electrical switching apparatus and, more particularly, to electrical switching apparatus for controlling a load. The disclosed concept also pertains to protection relays, such as motor protection relays, and to systems including controllers for controlling loads.

2. Background Information

Contactors are employed, for example and without limitation, in starter applications to switch on/off a load as well as to protect a load, such as a motor or other electrical device, from current overloads. Contactors are used as electrical switching apparatus and incorporate fixed and movable contacts that when closed, conduct electric power.

A starter is a device used to provide protection and control for a load, such as a single-phase or three-phase motor and the like, typically used in, for example, various industrial settings to operate machinery. A common type of starter includes an electromagnetic contactor and a motor protection relay. The contactor includes separable contacts that are connected to each phase of the motor, such that, when closed, the separable contacts connect the motor to an electrical source, such as a three-phase electrical source. The motor protection relay monitors the load current and, in some cases, voltage, and trips the contactor open if a problem condition, such as persistent over current, arises. Typically, the motor protection relay tracks an $I^2t$ characteristic of the load current, which is a measure of heating. Motor protection relays typically include a microprocessor, which digitally generates the $I^2t$ value. When the calculated $I^2t$ value reaches a designated trip level, the contactor is tripped open to interrupt the flow of current to the motor.

For flash protection, NFPA 70 110.16 and NFPA 70E 400.11 require that switchboards, panelboards, industrial control panels, meter socket enclosures, and motor control centers that are in other than dwelling occupancies and are likely to require examination, adjustment, servicing, or maintenance while energized be field marked to warn qualified persons of potential electric arc flash hazards. The marking shall be located so as to be clearly visible to qualified persons before examination, adjustment, servicing, or maintenance of the equipment.

A known process of displaying an available fault current, an incident energy and a personnel protective equipment (PPE) level (e.g., without limitation, gloves; flame retardant garments) for a particular power system is for an engineer to perform theoretical calculations using power system parameters. Then, based on those theoretical calculations, a printed label is affixed to the power system equipment stating the manually calculated available fault current, the manually calculated incident energy and the manually calculated PPE level. There is, however, no known way to verify the correctness of this information. There is further the risk that if the power system is modified, the manually calculated available fault current, the manually calculated incident energy and the manually calculated PPE level will change, but the printed label will not be timely changed, if at all.

There is room for improvement in electrical switching apparatus.

There is also room for improvement in protection relays, such as motor protection relays.

There is further room for improvement in systems including controllers for controlling loads.

SUMMARY

These needs and others are met by embodiments of the disclosed concept, which provides an electrical switching apparatus, such as for example and without limitation, a medium voltage motor starter that determines fault current available at a medium voltage motor and displays that available fault current along with a number of incident energy at medium voltage switchgear, and personal protective equipment (PPE) level required by operators or maintenance personnel assigned to operate or maintain the medium voltage switchgear.

In accordance with one aspect of the disclosed concept, a protection relay for an electrical switching apparatus for a load comprises: a number of voltage sensors structured to sense voltage applied to the load; a number of current sensors structured to sense current flowing to the load; a processor cooperating with the number of voltage sensors and the number of current sensors, the processor being structured to determine a fault current available at the load; and an output cooperating with the processor, the output being structured to output the determined fault current and a number of: incident energy at the electrical switching apparatus, and a personal protective equipment (PPE) level operatively associated with the electrical switching apparatus, wherein the processor is structured to determine from the determined fault current the number of: the incident energy at the electrical switching apparatus, and the personal protective equipment (PPE) level operatively associated with the electrical switching apparatus.

The output may be a display. The display may be structured to display the determined fault current, the incident energy at the electrical switching apparatus, the personal protective equipment (PPE) level, and personal protective equipment required to be worn.

The output may be structured to communicate with a communication network.

The processor may be structured to determine the personal protective equipment (PPE) level from a look-up table.

The fault current may be available short circuit current.

As another aspect of the disclosed concept, an electrical switching apparatus for a load comprises: a number of separable contacts; an operating mechanism structured to open and close the number of separable contacts; a number of voltage sensors structured to sense voltage applied to the load; a number of current sensors structured to sense current flowing through the number of separable contacts to the load; a processor cooperating with the number of voltage sensors and the number of current sensors, the processor being structured to determine a fault current available at the load; and a display cooperating with the processor, the display being structured to display the determined fault current and a number of: incident energy at the electrical switching apparatus, and a personal protective equipment (PPE) level operatively associated with the electrical switching apparatus, wherein the processor is structured to determine from the determined fault current the number of: the incident energy at the electrical switching apparatus, and the personal protective equipment (PPE) level operatively associated with the electrical switching apparatus.

As another aspect of the disclosed concept, a system comprises: an apparatus comprising: a processor, and an output; a number of controllers, each of the number of controllers comprising: a number of voltage sensors structured to sense voltage applied to a corresponding load, a number of current sensors structured to sense current flowing to the corresponding load, and a processor cooperating with the number of voltage sensors and the number of current sensors, the last such processor being structured to determine a fault current available at the corresponding load; and a number of communication channels between the number of controllers and the apparatus, each of the number of communication channels being structured to communicate the determined fault current from a corresponding one of the number of controllers to the apparatus, wherein the processor of the apparatus is structured to determine from the determined fault current of one of the number of controllers a number of: incident energy at such one of the number of controllers, and a personal protective equipment (PPE) level operatively associated with such one of the number of controllers, and wherein the output of the apparatus is structured to output the determined fault current of such one of the number of controllers and the number of: the incident energy at such one of the number of controllers, and the personal protective equipment (PPE) level operatively associated with such one of the number of controllers.

The number of controllers may be a plurality of controllers; and the number of communication channels may be a communication network between the plurality of controllers and the apparatus.

The number of controllers may be a plurality of controllers; and the processor of the apparatus may be structured to determine a maximum fault current from the determined fault current of the plurality of controllers and to determine from the determined maximum fault current the number of: the incident energy at such one of the number of controllers, and the personal protective equipment (PPE) level operatively associated with such one of the number of controllers.

As another aspect of the disclosed concept, an electrical switching apparatus for a load comprises: a number of separable contacts; an operating mechanism structured to open and close the number of separable contacts; a number of voltage sensors structured to sense voltage applied to the load; a number of current sensors structured to sense current flowing through the number of separable contacts to the load; a processor cooperating with the number of voltage sensors and the number of current sensors, the processor being structured to determine a fault current available at the load; and a display cooperating with the processor, the display being structured to display the determined fault current available at the load.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "low voltage" shall mean any voltage that is less than about 600 $V_{RMS}$.

As employed herein, the term "medium voltage" shall mean any voltage greater than a low voltage and in the range from about 600 $V_{RMS}$ to about 52 $kV_{RMS}$.

As employed herein, the term "controller" means the combination of a contactor and a protective relay.

As employed herein, the terms "protection relay" or "protective relay" can include, for example and without limitation, a number of current and/or voltage sensors, a processor, and a control circuit to open and close a contactor. The relay and/or current and/or voltage sensors can be part of or be separate from a contactor.

As employed herein, the term "contactor" includes, for example and without limitation, a low voltage contactor; a medium voltage contactor; or an electrically operated low or medium voltage circuit breaker. A contactor can include, for example and without limitation, a number of separable contacts and an operating mechanism. Contactors and circuit breakers may also include auxiliary contacts.

As employed herein, the term "switchgear" includes, for example and without limitation, an assembly of one or more motor starters that can also contain circuit breakers and fused switches.

The disclosed concept is described in association with magnetically closed contactors, such as three-pole vacuum contactors or three-phase medium voltage motor starters, although the disclosed concept is applicable to a wide range of electrical switching apparatus or protection relays having any number of phases or poles for a wide range of voltages. For example and without limitation, aspects of the disclosed concept can advantageously be employed with electrically operated low or medium voltage circuit breakers.

Figure 1:
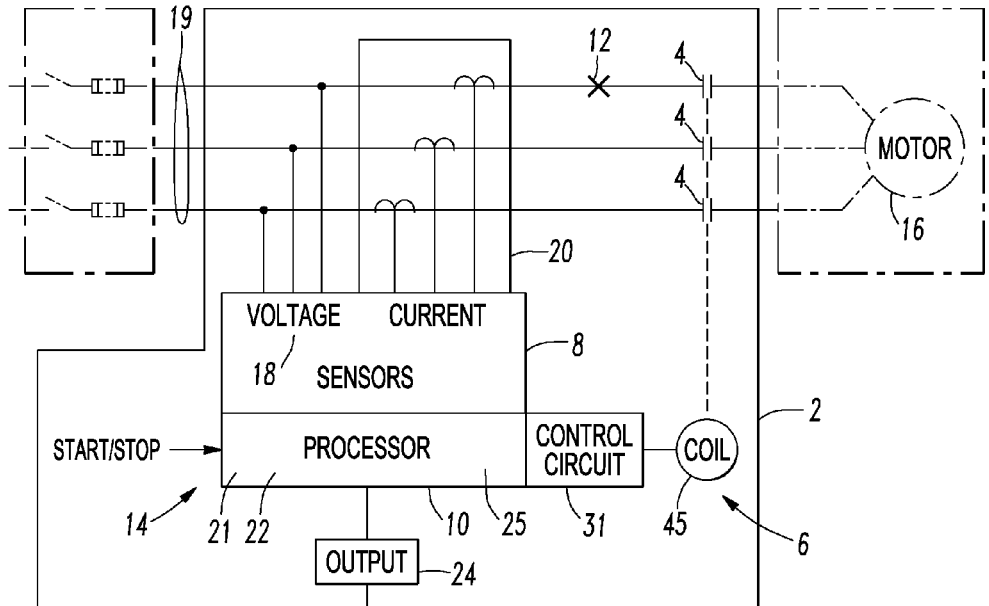
FIG. 1 is a block diagram in schematic form of a three-phase medium voltage motor starter in accordance with embodiments of the disclosed concept.

Referring to FIG. 1, an electrical switching apparatus (e.g., without limitation, a medium voltage or low voltage electrical switching apparatus, such as a circuit interrupter, circuit breaker or fused switch; a three-phase electrical switching apparatus; a motor starter; medium voltage or low voltage motor starter; a three-phase motor starter; a three-pole controller; a three-pole contactor), such as the example three-phase medium voltage motor starter 2, is shown. The example motor starter 2 includes a number (e.g., without limitation, three are shown) of separable contacts 4, an operating mechanism 6 structured to open and close the separable contacts 4, a number of sensors 8 structured to sense voltage and to sense current flowing through the separable contacts 4, and a processor 10 structured to cooperate with the operating mechanism 6 to open and close the separable contacts 4. As is conventional, the processor 10 can further be structured to determine a fault 12 (e.g., without limitation, a single-phase line-to-ground fault; a single-phase line-to-line fault; a three-phase line-to-line fault; a line-to-line and ground fault) from the sensed current flowing through the separable contacts 4.

The processor 10 and sensors 8 cooperate to provide a protection relay 14 for a load, such as for example and without limitation, a three-phase medium voltage motor protection relay for the example three-phase medium voltage motor 16. The sensors 8 include a number (e.g., without limitation, three are shown) of voltage sensors 18 structured to sense the example three-phase line voltage 19 applied to the motor 16 and a number (e.g., without limitation, three are shown) of current sensors 20 structured to sense current flowing to the motor 16. The processor 10 includes a number of routines, such as for example and without limitation, a protection routine 21 and a routine 22, which will be discussed, below, in connection with FIG. 2.

Briefly, the processor 10 cooperates with the number of voltage sensors 18 and the number of current sensors 20, and determines a fault current available at the motor 16. The processor 10 also determines from the determined fault current a number of: (1) the incident energy at the example motor starter 2; and (2) the personal protective equipment (PPE) level operatively associated with the example motor starter 2. An output 24 cooperates with the processor 10 and outputs the determined fault current and a number of: (1) the incident energy at the example motor starter 2; and (2) the personal protective equipment (PPE) level operatively associated with the example motor starter 2.

EXAMPLE 1

The output 24 can be an annunciator or a display cooperating with the processor 10 and displaying the determined fault current and a number of: (1) the incident energy at the example motor starter 2; and/or (2) the personal protective equipment (PPE) level operatively associated with the example motor starter 2.

EXAMPLE 2

The output 24 can communicate with a communication network (e.g., 80 of FIG. 4), which can communicate to a local or remote location the determined fault current and a number of: (1) the incident energy at the example motor starter 2; and/or (2) the personal protective equipment (PPE) level operatively associated with the example motor starter 2.

EXAMPLE 3

The processor 10 can determine the personal protective equipment (PPE) level from a look-up table 25, which converts the incident energy at the example motor starter 2 to a corresponding PPE level.

EXAMPLE 4

Figure 2:
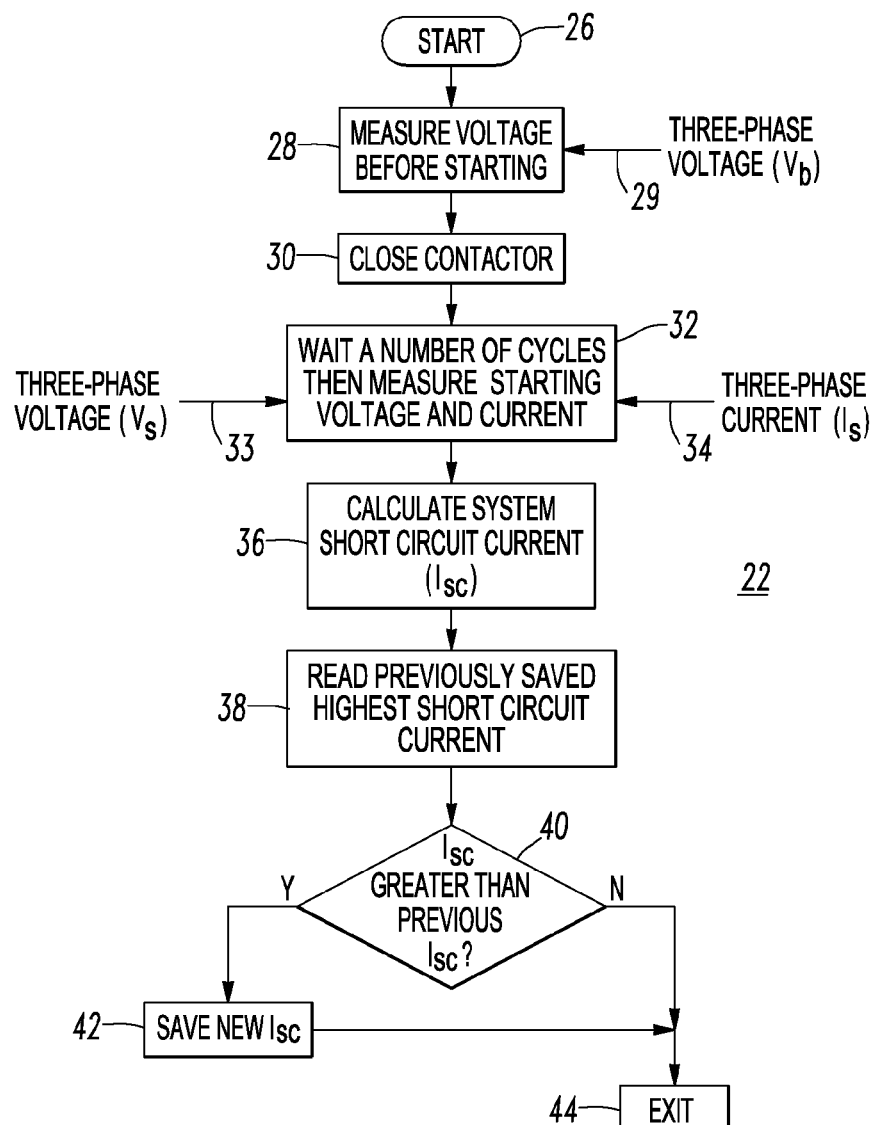
FIG. 2 is a flowchart of a routine for the processor of FIG. 1.

The determined fault current can be available short circuit current at the example motor starter 2. FIG. 2 shows the routine 22 for the processor 10 of FIG. 1. With each start of the example motor 16, three-phase voltage (before starting), and three-phase voltage and three-phase current (during starting) are measured (e.g., sensed). The three-phase voltage and three-phase current measurements are taken after closing the separable contacts 4 and after a number of cycles into the start, in order to eliminate disturbances caused by such closing. As will be discussed, the processor routine 22 determines the available short circuit current, $I_{sc}$.

For each start of the example motor 16 (shown in phantom line drawing in FIG. 1), the line voltage (e.g., without limitation, $V_s$) and the line current (e.g., without limitation, $I_s$) are sensed by the respective voltage and current sensors 18 and 20. Preferably, the readings are taken a number of cycles (e.g., without limitation, 10) into starting to eliminate the disturbances typically seen after closing the separable contacts 4. The voltage drop ($V_d$ (per unit)) and the starting line current ($I_s$ (amperes)) are used to calculate the available short circuit current ($I_{sc}$(amperes)) as shown by Equations 1 and 2, respectively.

$$V_d = (V_b - V_s)/V_b \quad \text{(Eq. 1)}$$

wherein:
$V_d$ is voltage drop (per unit);
$V_b$ is line voltage before starting (volts); and
$V_s$ is line voltage during starting (volts).

$$I_{sc} = I_s/V_d \quad \text{(Eq. 2)}$$

wherein:
$I_{sc}$ is available short circuit current (amperes); and
$I_s$ is starting current or line current during starting (amperes).

Continuing to refer to FIG. 2, at 26, the routine 22 starts. Next, at 28, the routine 22 measures $V_b$ 29, the line voltage before starting, after which, at 30, the separable contacts 4 are closed by the control circuit 31 (FIGS. 1 and 3), as will be explained. Then, at 32, the routine 22 waits, for example and without limitation, a number of cycles (e.g., without limitation, about ten line cycles) before measuring $V_s$ 33, the line voltage during starting, and $I_s$ 34, the line current during starting. Next, at 36, the routine 22 calculates the available short circuit current, $I_{sc}$, using, for example, Equations 1 and 2.

Then, at 38, a previously saved, highest available short circuit current, $I_{highest\_sc}$, from a prior start is read. Next, at 40, the available short circuit current, $I_{sc}$, for the current start is compared to the previously saved, highest available short circuit current, $I_{highest\_sc}$, from a prior start (e.g., without limitation, the highest short circuit current in the past six months). If the available short circuit current, $I_{sc}$, for the current start is the larger value, then it is saved, at 42, as the highest available short circuit current, $I_{highest\_sc}$, from a prior start. This event can be logged along with the voltages ($V_b$, $V_s$) and current ($I_s$), the available short circuit current ($I_{sc}$), and the time and date of the event. Otherwise, or after 42, the routine 22 exits at 44.

EXAMPLE 5

Figure 3:
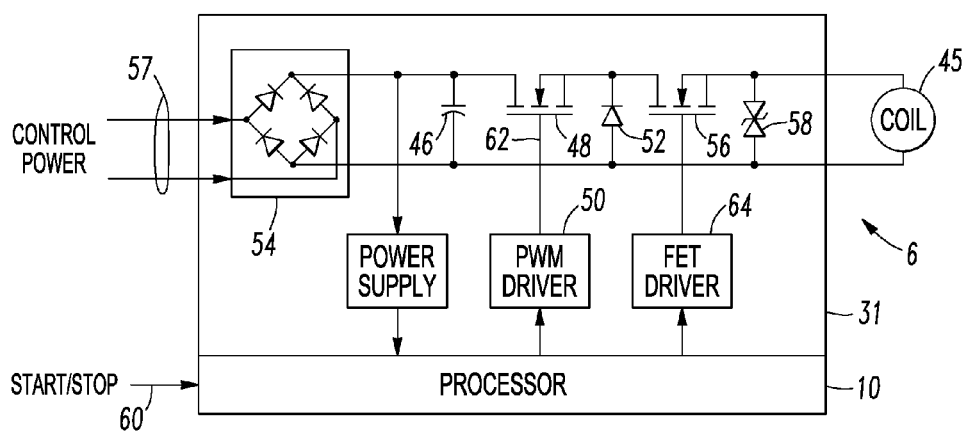
FIG. 3 is a block diagram in schematic form of the coil control circuit of FIG. 1.

Referring to FIG. 3, the operating mechanism 6 includes the control circuit 31 and a coil 45. The processor 10 and the control circuit 31 preferably cause an immediate depletion of the back electromotive force (EMF) of the coil 45 to reduce the opening time of the separable contacts 4. This is useful in those cases where the fault current is less than the contactor interrupting rating.

The example control circuit 31 includes a capacitor 46, a switch, such as a field effect transistor (FET) 48, and a pulse width modulated (PWM) driver 50 for driving the FET 48. When the FET 48 is turned on by the PWM driver 50, a diode 52 is reverse biased and does not conduct. On the other hand, when the FET 48 is turned off by the PWM driver 50, the back EMF of the coil 45 causes the diode 52 to be forward biased and conduct a circulating current through the coil 45 until the FET 48 starts to conduct again. This circulating current keeps the separable contacts 4 closed until the FET 48 starts to conduct again.

The example control circuit 31 also includes a suitable charging circuit, such as the example full-wave bridge 54, to charge the capacitor 46 from a control voltage 57 with sufficient energy to hold the separable contacts 4 closed and to keep the processor 10 operational for at least a predetermined time after loss of the control voltage 57. The PWM driver 50, after energizing the coil 45 for a predetermined time, reduces the voltage to the coil 45 to a predetermined voltage, which holds the separable contacts 4 closed.

The control circuit 31 also includes a second switch, such as the example FET 56, which is electrically connected in series with the first FET 48, and a transorb 58 electrically connected in parallel with the coil 45. The processor 10 opens the separable contacts 4 by causing the second FET 56 to turn off. The turning off of FET 56 causes the back EMF of the coil 45 to be conducted through the transorb 58 at a predetermined voltage, which causes the separable contacts 4 to open after a predetermined time.

The example control voltage 57 can be, for example and without limitation, 120 VAC, 125 VDC or 240 VAC. For example, this voltage 57 preferably charges the capacitor 46 with sufficient energy to hold the separable contacts 4 closed and keep the processor 4 operational for an adjustable time delay up to about 300 milliseconds after the loss of the control voltage 57.

When the processor 10 receives a start command 60, it causes the PWM driver 50 to turn on the FET 48 with a PWM signal 62. The processor 10 also causes an FET driver 64 to turn on the second FET 56. A non-limiting example rate of the PWM signal 62 is about 1000 Hz.

Figure 4:
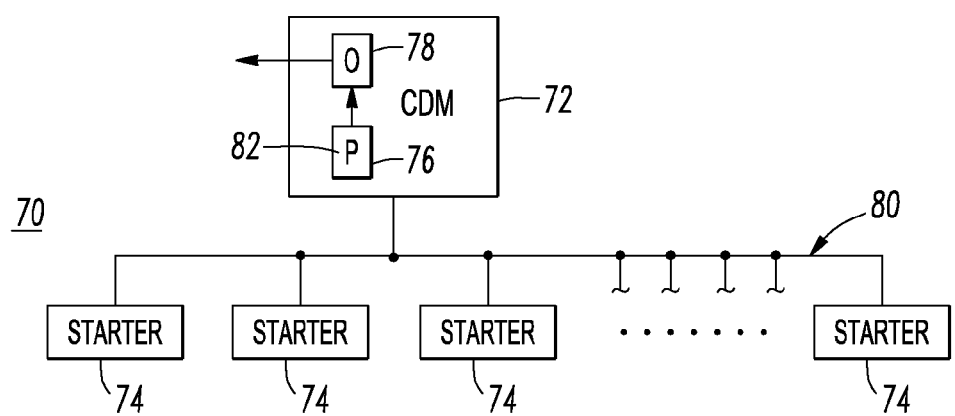
FIG. 4 is block diagram in schematic form of a system including a display module and a number of controllers in accordance with other embodiments of the disclosed concept.

Referring to FIG. 4, a system 70 is shown including an apparatus, such as the example central display module (CDM) 72, and a number of controllers, such as the example motor starters 74, which can be the same as or similar to the example three-phase medium voltage motor starter 2 of FIG. 1. The CDM 72 includes a processor (P) 76 and an output (O) 78. A number (e.g., without limitation, one communication network 80 (e.g., without limitation, an RS-485 network; Ethernet; INCOM; any suitable communication network; examples of the INCOM network and protocol are disclosed in U.S. Pat. Nos. 4,644,547; 4,644,566; 4,653,073; 5,315,531; 5,548,523; 5,627,716; 5,815,364; and 6,055,145) is shown, although any suitable number of communication channels can be employed, such as a number of wired or wireless communication links) between the example motor starters 74 and the example CDM 72. The example communication network 80 is structured to communicate the determined fault current (e.g., $I_{sc}$; $I_{highest\_sc}$) from any number of the example motor starters 74 to the example CDM 72. Somewhat similar to the routine 22 of FIG. 2, the CDM processor 76 is structured to determine from the determined fault current of the motor starters 74 a number of: (1) incident energy at corresponding switchgear (not shown); and (2) a personal protective equipment (PPE) level operatively associated with such corresponding switchgear or main power bus. The CDM output 78 is structured to output the determined fault current of the motor starters 74 and a number of: (1) the incident energy at corresponding switchgear (not shown); and (2) the personal protective equipment (PPE) level operatively associated with such corresponding switchgear or main power bus.

EXAMPLE 6

As shown in FIG. 4, the number of controllers is a plurality of motor starters 74 and the number of communication channels is the single communication network 80 between the example motor starters 74 and the example CDM 72.

EXAMPLE 7

Somewhat similar to the processor 10 of FIG. 1, the CDM processor 76 can determine the maximum fault current (e.g., $I_{highest\_sc}$) from the determined fault current of the motor starters 74 and determine from the determined maximum fault current a number of: (1) the incident energy at corresponding switchgear (not shown); and (2) the personal protective equipment (PPE) level operatively associated with such corresponding switchgear.

EXAMPLE 8

The example motor starters 74 are on the same power bus (e.g., without limitation, a medium voltage 4160 $VAC_{RMS}$ main power bus) (not shown) and have the same bolted short-circuit current. For example, each of the motor starters 74 calculates its current available short circuit current, $I_{sc}$ and/or its highest available short circuit current, $I_{highest\_sc}$, and communicates that to the CDM 72 over the communication network 80.

EXAMPLE 9

Figure 5:
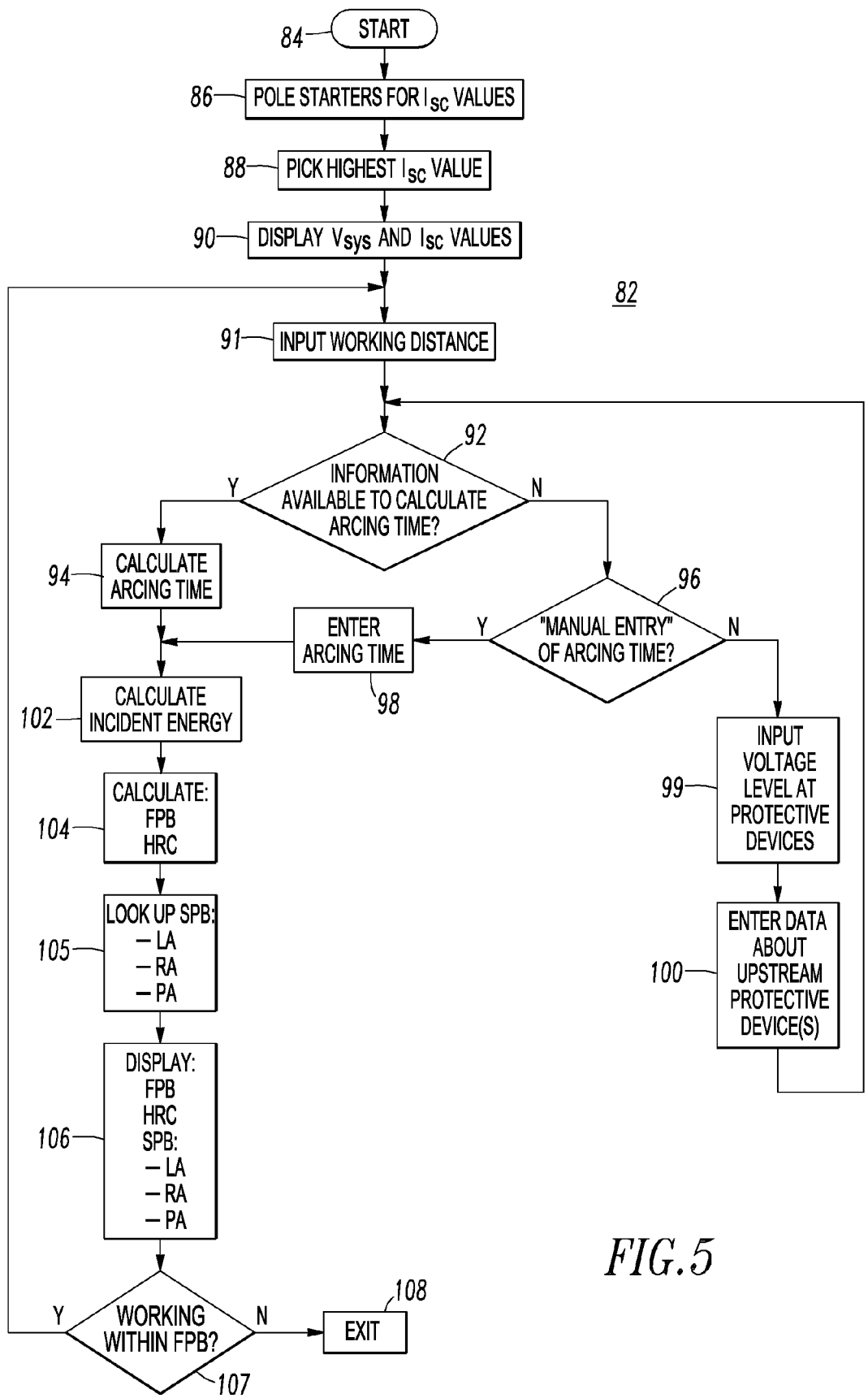
FIG. 5 is a flowchart of a routine for the processor of the display module of FIG. 4.

FIG. 5 shows a routine 82 for the CDM processor 76 of FIG. 4. The routine 82 preferably performs calculations for arcing time, incident energy, FPB, HRC and SPB based on IEEE Std 1584—IEEE Guide for Performing Arc-Flash Hazard Calculations.

After starting, at 84, the routine 82 polls the various motor starters 74 of FIG. 4 for their corresponding available short circuit current ($I_{sc}$) values. Then, at 88, the largest of those values is selected and is displayed, at 90, along with the line-to-line system voltage ($V_{sys}$). For example, for a common main power bus (not shown) of the various motor starters 74, this provides a worst case available short circuit current ($I_{sc}$) value that can be displayed and used for subsequent calculations of, for example, incident energy and PPE levels. Then, at 91, the working distance (e.g., without limitation, 12, 18, 24, 36 or 48 inches) is input.

Next, at 92, it is determined whether sufficient information is available to calculate arcing time. For example, either the arcing time can be manually entered at 98, or the information used to calculate arcing time can be entered at 100. If sufficient information is available at 92, then arcing time is calculated at 94, as will be explained. Otherwise, if sufficient information is not available, at 92, then manual entry of arcing time is requested at 96. If manual entry of arcing time is requested, then the arcing time is input at 98. Then, after 94 or 98, the routine 82 calculates incident energy at 102, calculates flash protection boundary (FPB) and hazard risk category (HRC) at 104, as will be explained, and looks up shock protection boundary (SPB) including limited approach (LA), restricted approach (RA) and prohibited approach (PA) from the look-up table 25 (FIG. 1) at 105. Next, the routine 82 displays FPB, HRC, and SPB including LA, RA and PA at 106. Finally, at 107, it is determined if the working distance of step 91 is within the FPB of step 104. If so, then step 91 is repeated. Otherwise, the routine 82 exits at 108.

If manual entry of arcing time is not requested at 96, then various data is input at 100 regarding upstream protective devices, after which 92 is repeated. Hence, arcing time is either requested at 96 by manual input at 98, or is calculated at 94 based on user input at 100.

Information on example upstream protective (e.g., over current) devices as employed by step 94 are discussed in Examples 10-13 and 19, below.

EXAMPLE 10

If a fuse (not shown) is employed as an upstream (e.g., with respect to the main power bus (not shown) of the various example motor starters 74 of FIG. 4) protective device, then the corresponding information includes the fuse's current rating, the type of fuse, and the location in the system (e.g., voltage level; for example, the current is reduced if the protection fuse or circuit breaker is at a higher system voltage than the motor starters 74; for instance, if a motor starter 74 is at 4,160 volts, the $I_{sc}$ is 10 kA, and the fuse is at 23 kV, then the short circuit current will only be about 1,809 amperes). Preferably, compensation for system components, such as transformers, is provided.

EXAMPLE 11

For a thermal-magnetic circuit breaker (not shown), the corresponding information includes the thermal-magnetic circuit breaker's trip rating, its instantaneous setting, and the location in the system (e.g., voltage level).

EXAMPLE 12

For a circuit breaker with electronic trip (not shown), the corresponding information includes the pickup, trip or plug rating (e.g., amperes; a multiple of the current sensor level), the long time pickup setting, the short time pickup setting, the instantaneous setting, whether the trip is based on $I^2T$ (e.g., trip setting in amperes, squared, times the time in seconds), and the location in the system (e.g., voltage level).

EXAMPLE 13

For an electro-mechanical over current (O/C) relay (not shown), the corresponding information includes the relay's current transformer (CT) rating for the primary (e.g., without limitation, 600 amperes) and the secondary (e.g., without limitation, 5 amperes), relay curves (e.g., without limitation, ANSI Moderate Inverse (CO-7), ANSI Very Inverse (CO-9) and ANSI Extremely Inverse (CO-11)), the tap setting (e.g., without limitation, 0.5 to 12 amperes), the time dial settings (e.g., without limitation, 0.5, 1, 2, 3, 4, 5, 6, 7, 8, 9, 10, 11, 12), the instantaneous "in times" CT ratio, and the location in the system (e.g., voltage level).

EXAMPLE 14

At 102 of FIG. 5, the incident energy (cal/cm²) is calculated at a specified working distance (e.g., without limitation, 12, 18, 24, 36 or 48 inches). The incident energy is also calculated at a predetermined distance, for example, of 36 inches. This is the distance that a person working in the area, but not on the equipment, would enter to know his/her PPE requirements as he/she, without limitation, sweeps the floor or paints a wall.

The HRC (hazard risk category) of 104 of FIG. 5 is determined to be in the range from 0 to 4.

EXAMPLE 15

A listing of the corresponding PPE level can be determined from the look-up table 25 of FIG. 1 based upon the HRC of 104 and the incident energy of 102. For example, for HRC Level 0 and incident energy of 1 cal/cm², the output could be: coveralls (1 Layer), Indura® Ultrasoft Style 301, minimum arc rating=8 cal/cm², and safety glasses for the PPE level.

EXAMPLE 16

Figure 6:
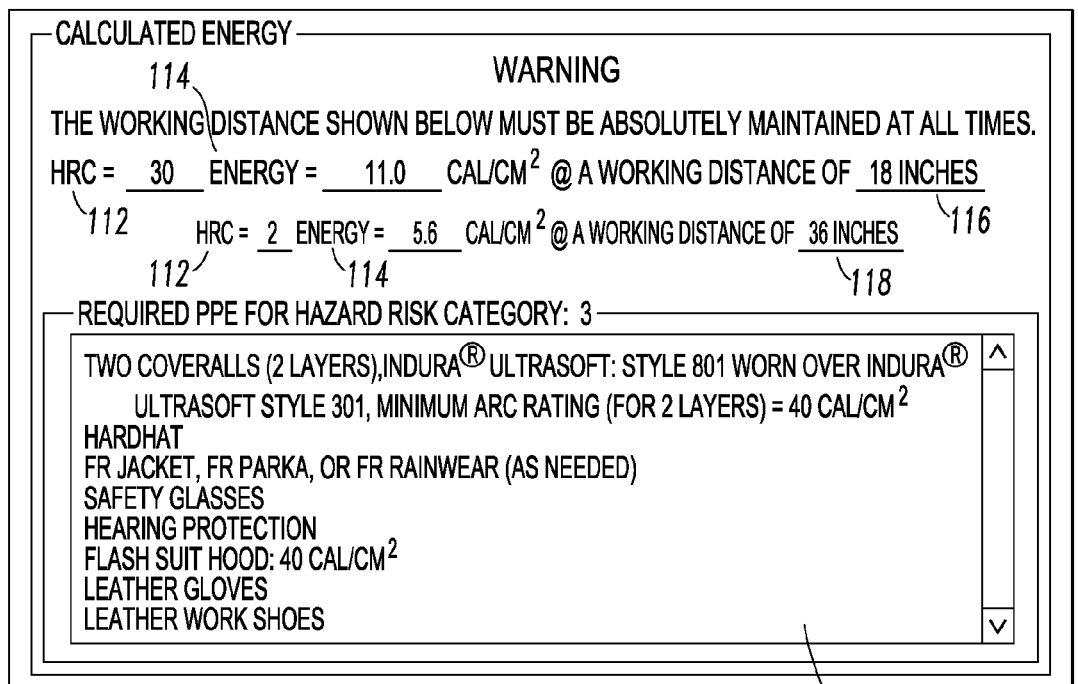
FIGS. 6 and 7 are display outputs of the display module of FIG. 4.
Figure 7:
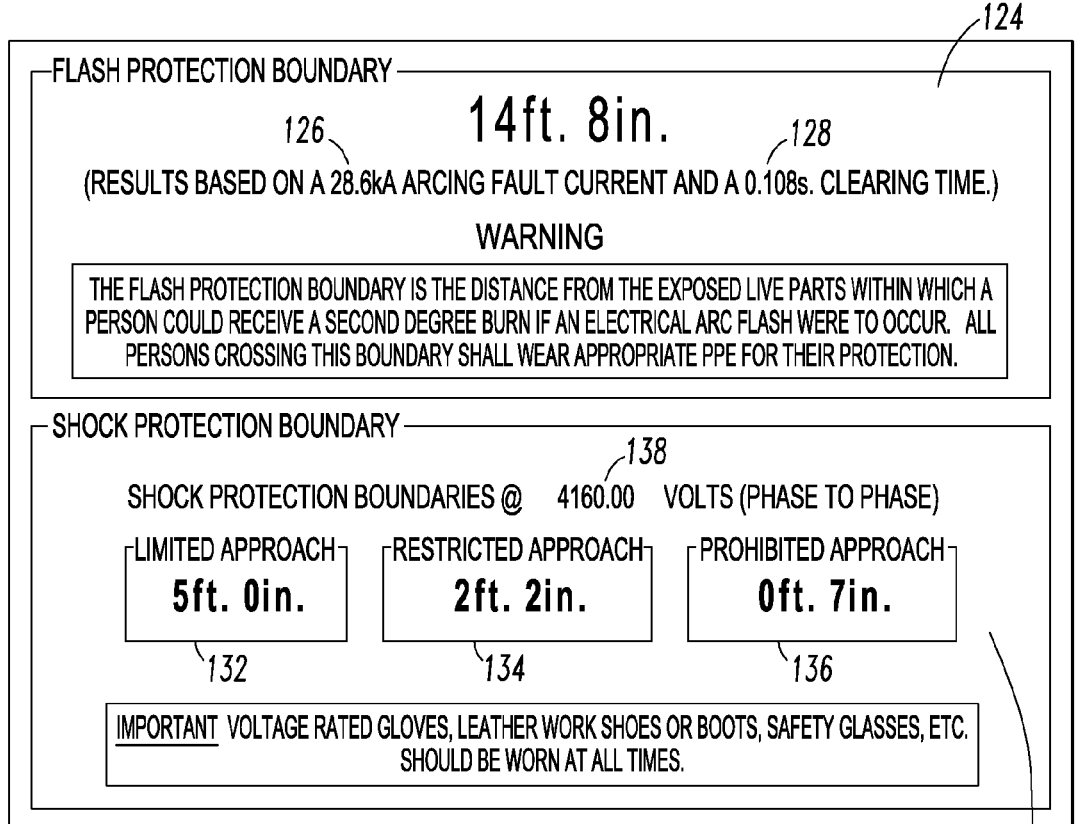

FIGS. 6 and 7 are example display outputs of either the output 24 of FIG. 1 or the output 78 of FIG. 4.

The example display output 110 of FIG. 6 shows HRC 112 and incident energy 114 at two different working distances 116,118 as well as the PPE level 120.

The example display output 122 of FIG. 7 shows the FPB 124 based upon the available short circuit current ($I_{sc}$) 126 and arcing time 128, along with the SPB 130 for LA, RA and PA distances 132, 134 and 136, respectively, at the main bus voltage 138. For example, the shock protection boundary (SPB) listing for the main bus voltage 138 level of the example motor starters 74 of FIG. 4 can include the limited approach (LA) distance 132, which is the distance an unqualified worker must stay away from the energized equipment, the restricted approach (RA) distance 134, which is the distance a qualified worker must stay away from the energized equipment without voltage rated PPE (personal protective equipment) (e.g., without limitation, gloves and/or other PPE), and the prohibited approach (PA) distance 136, which is the distance considered to be the same as actually touching the energized equipment.

EXAMPLE 17

Since a user is required by NFPA 70 National Electric Code and OSHA marked on every lineup of electrical equipment, the example display output 122 of FIG. 7 can function as that marking.

EXAMPLE 18

The following is an example of the incident energy calculation of step 102 of FIG. 5. At 86, the CDM 72 (FIG. 4) sends a request to each starter 74 for its calculated available short circuit current ($I_{sc}$) 126. This can be calculated each motor start and updated to reflect the highest recorded value, for example, in the past six months. At 88, the CDM 72 picks the highest $I_{sc}$ 126 of the starters 74 and uses it to calculate the incident energy at, for example, a medium voltage motor control center (MV-MCC). The short circuit current ($I_{sc}$) of step 88, the system voltage ($V_{sys}$) of step 90, the arcing time of steps 94 or 98, and the working distance of step 91 are employed to calculate the incident energy for the MV-MCC using equation D.7 of NFPA 70 E-2004 as shown in Equation 3:

$$E=(793 \times I_{sc} \times V_{sys} \times T_a)/D^2 \quad \text{(Eq. 3)}$$

wherein:
E is incident energy (cal/cm²);
$I_{sc}$ is bolted short circuit current (kA);
$V_{sys}$ is the MV-MCC line-to-line voltage (kV);
$T_a$ is arcing time (S); and
D is distance from the arc source (inches).

EXAMPLE 19

The following is an example of the arcing time calculation of step 94 of FIG. 5. At step 96, the CDM 72 asks for manual entry of arcing time. If known, then arcing time is entered at 98. For example, if a coordination study has been performed, then responsible engineer can use the displayed $I_{sc}$ of step 90 and use the coordination drawing (not shown) to determine the arcing time ($T_a$). Otherwise, at 94, the CDM 72 calculates a conservative arcing time. Conservative, in this example, means that the conservative arcing time is equal to or longer than the time that will actually occur. This will result in a relatively higher incident energy level and a corresponding higher PPE requirement.

Otherwise, if the arcing time is not known at 96, then step 99 inputs the voltage level at the upstream protective device (s) (not shown). For example, often the primary protection is on the source side of a distribution transformer (not shown). As a result, the short circuit current is reduced by the voltage ratio of the transformer. For example, if the line-to-line voltage of the MV-MCC is 4,160 volts and the primary voltage is 13,200 volts of the transformer as controlled by a circuit breaker and a relay, then the current flowing in the primary will be 31.5% of the $I_{sc}$.

Step 100 enters data about the upstream protective device (s). This determines whether the type of protection is a fuse or a circuit breaker. If the type of protection is a fuse, then the current rating ($I_f$) and fuse type are input. Next, the type of fuse is determined. For example, there can be two types of medium voltage fuses with very different time current interruption characteristics, namely, general purpose current limiting and expulsion. Because the arcing current is only about 85% to about 90% of $I_{sc}$, the current employed is $0.85 \times I_{sc}$.

After the relevant information is collected, step 94 can determine the current limiting fuse arcing time from Equation 4:

$$T_a = e^{(aX^2+bX+c)} \qquad \text{(Eq. 4)}$$

wherein:
a is 0.7494 for a current limiting fuse;
b is −7.8537 for the current limiting fuse;
c is 15.111 for the current limiting fuse;
$X = \ln(0.85 \times I_{sc}/I_f)$;
$I_{sc}$ is bolted short circuit current (kA);
$I_f$ is the fuse current rating; and
e is the base for the natural logarithm (about 2.71828).

In a similar fashion, after the relevant information is collected, step 94 can determine the expulsion fuse arcing time from Equation 4,
wherein:
a is 0.6769 for an expulsion fuse;
b is −6.2051 for the expulsion fuse; and
c is 11.594 for the expulsion fuse.

These provide relatively longer arcing times than are to be expected and, therefore, a conservative approach to PPE requirements.

For other fuse curves (e.g., without limitation, type K), those fall between the general purpose current limiting fuse and the expulsion fuse, which is the slowest. Although additional calculations could be employed, a conservative approach is to employ the expulsion fuse calculations for a "not sure" category, thereby providing a relatively longer arcing time calculation and a relatively more conservative approach to PPE requirements.

If a fuse is not used for primary protection, then a circuit breaker, such as a medium voltage circuit breaker (MVCB) can be employed. All MVCBs use over current relays to detect circuit mis-operation and disconnect the main bus from the power system. The current flowing in the main circuit is isolated and reduced by current transformers (CTs) to a standardized secondary level of either 1 A or 5 A. At 100, the CDM 72 inputs the CT ratio or the primary and secondary ampere ratings.

These are many different types of overload trip curves. However, three types have been generally used about 90% of the time for main bus protection. The shape of these curves has been established by the IEEE Relay Committee. The only difference between the curves of electromechanical and electronic microprocessor based relays is that the pickup current is set by the tap setting in the electromechanical relay and has much finer adjustment in the electronic microprocessor based relays. Step 100 inputs the type of overcurrent curve (e.g., ANSI; IEC) and inputs the shape (e.g., moderately inverse; very inverse; extremely inverse). Moderately inverse (MINV) means that as the current increases, the time decreases faster in a nonlinear fashion. This shape is typically used to protect systems including relatively large motor starters with relatively long acceleration times. Very inverse (VINV) is typically used to protect systems that have moderately sized motors and yet remove the short circuit relatively quickly to limit the damage caused by a short circuit. Extremely inverse (EINV) is typically used to protect systems that have furnaces and non-motor loads, but can have relatively very short duration high current surges.

There is an instantaneous setting used on overcurrent relays employed to eliminate the time delay during bolted short circuit events. It is a common practice not to include instantaneous elements in relays protecting MV-MCCs. The coordination with the motor starting fuses and instantaneous functions is difficult; often both a motor protection fuse and the instantaneous element, the fuse, clear the fault and the instantaneous element causes the feeder breaker to open. This is called nuisance tripping on relatively large motor and transformer loads.

It takes about one cycle or 17 mS for the relay to sense the current and close, thereby starting the circuit breaker tripping event. NFPA 70E-2004 requires that five line cycles (e.g., about 0.083 S at 60 Hz) be employed for the MVCB's total clearing time.

At 100, if the type of relay is an electro-mechanical relay, then the tap setting is input. This is the CT secondary current level that would just cause the relay to close and start the trip event. The tap setting has a fixed values (e.g., without limitation, 0.5; 1.0; 1.5) and is a tap on the relay's magnetic closing coil. This can be seen as a screw on the relay face plate or is given on a relay coordination study. Finally, the time dial setting, which establishes the distance an induction disk travels before closing the trip contact and starting the trip event, is input followed by input of the instantaneous current setting, which is the level of CT secondary current (A) flowing that would start the trip event without a deliberate time delay.

Otherwise, at 100, if the type of relay is an electronic microprocessor based relay, then the pick-up current (PU) is input; this is the CT secondary current level that just causes the relay to start the trip event. It is typically adjustable in steps of about 0.1 A and is displayed as a relay setting on the faceplate of the relay when in the program mode. This can also be given on the relay coordination study. For the electronic microprocessor based relay, input of the time dial setting (TD) at 100 establishes the time required before closing the trip contact and starting the trip event at a particular current level.

Although entry of CT secondary current is disclosed, some relay manufacturers provide a relay in which the values of current are the primary current levels. In this case, if for example, the entered current settings are above 50 A, then suitable confirmation can be requested (e.g., without limitation, "are the current values in primary amperes?").

After the relevant information is collected, step 94 can determine the time to trip from Equation 5:

$$T = TD \times (A + B/(M^C - 1)) \quad \text{(Eq. 5)}$$

wherein:

the fault current is 0.85 times the calculated bolted fault current and gives a relatively longer arcing time than is to be expected and, therefore, a conservative approach to PPE requirements;

T is time to trip (S);
TD is time dial setting (unitless);
$M = (I_{sc}/CTr)/PU$ (unitless);
$I_{sc}$ is calculated bolted short circuit current (A);
CTr is CT ratio (primary amperes/secondary amperes) (unitless);
PU is CT secondary current (A) at which the trip function will activate; and
A, B, and C are constants as shown in Table 1.

TABLE 1

|  | A | B | C |
|---|---|---|---|
| ANSI MINV | 0.0226 | 0.0104 | 0.02 |
| ANSI VINV | 0.0963 | 3.8800 | 2 |
| ANSI EINV | 0.0352 | 5.6700 | 2 |
| IEC MINV | 0 | 0.1400 | 0.02 |
| IEC VINV | 0 | 13.5000 | 1 |
| IEC EINV | 0 | 80 | 2 |

For example, most MVCBs take about five line cycles or about 83 mS (e.g., at 60 Hz) to operate and it is customary to add about one line cycle or about 17 mS for relay operation. So, the calculated trip time will be $T_a = T + 0.100$ S for the incident energy calculation.

If there is an instantaneous current level ($I_{inst}$), then:

$$I_{inst} < (0.85 \times I_{sc}/CTr) \quad \text{(Eq. 6)}$$

Again, since most MVCBs take about five line cycles or about 83 mS (e.g., at 60 Hz) to operate and it is customary to add about one line cycle or about 17 mS for relay operation. So, the calculated trip time will be $T_a = 0.100$ S for the incident energy calculation.

EXAMPLE 20

This example covers the calculation of the Flash Protection Boundary (FPB) of step 104. At voltages levels above 600 volts, the FPB is the distance at which the incident energy equals 5 J/cm² (1.2 cal/cm²). For situations where the fault-clearing time is 0.1 S (or faster), the FPB is the distance at which the incident energy level equals 6.24 J/cm² (1.5 cal/cm²). This is defined by NFPA 70E 130.3 (A) second paragraph and is the burn level at which the skin will just heal without scaring. The FPB distance is calculated in accordance with the following formulae D.3(d) and D.3(e) Modified of (NFPA 70 E-2004) as shown in Equation 7.

$$FPB = 53 \times MVA_{bf} \times T \quad \text{(Eq. 7)}$$

wherein:

FPB is the flash protection boundary (feet);
$MVA_{bf} = 1.732 \times V \times I_{sc} \times 0.707/10^6$;
$MVA_{bf}$ is the bolted fault energy of the arc (MVA);
T is arcing time (S);
$I_{sc}$ is bolted short circuit current (A); and
V is line-to-line voltage (V).

EXAMPLE 21

This example covers the calculation of the Hazard Risk Category (HRC) of step 104. Table 2 defines the HRC based upon Table 130.7 (C)(9)(a) of NEMA E2 (fused contactor) for motor starters 2.3 kV through 7.2 kV.

TABLE 2

| Task (Assumes Equipment is Energized, and Work is Done Within the Flash Protection Boundary) NEMA E2 (fused contactor) Motor Starters, 2.3 kV through 7.2 kV | Hazard/Risk Category | V-Rated Gloves | V-Rated Tools |
|---|---|---|---|
| Contactor operation with enclosure doors closed | 0 | No | No |
| Reading a panel meter while operating a meter switch | 0 | No | No |
| Contactor operation with enclosure doors open | 2 | No | No |
| Work on energized parts, including voltage testing | 3 | Yes | Yes |
| Work on control circuits with energized parts 120 V or below, exposed | 0 | Yes | Yes |
| Work on control circuits with energized parts >120 V, exposed | 3 | Yes | Yes |
| Insertion or removal (racking) of starters from cubicles, doors open | 3 | No | No |
| Insertion or removal (racking) of starters from cubicles, doors closed | 2 | No | No |
| Application of safety grounds, after voltage test | 3 | Yes | No |
| Removal of bolted covers (to expose bare, energized parts) | 4 | No | No |
| Opening hinged covers (to expose bare, energized parts) | 3 | No | No |

As can be seen, the HRC depends on the work an individual is doing.

EXAMPLE 22

At step 106 of FIG. 5, the incident energy, the PPE HRC, FPB and SPB of FIGS. 6 and 7 can be displayed.

For example, a popup (not shown) can ask if work is expected to be within the FPB of FIG. 7. If so, then the popup can ask if doors/covers are to be opened. If so, then the HRC can be displayed with a list of the appropriate PPE required. Preferably, the FPB distance is prominently displayed (e.g., without limitation, in red) if it is greater than the expected working distance of step 91.

Although default PPE listings are provided, preferably those are modified based upon particular site requirements.

The example SPB boundaries: LA, RA and PA are the same for 751 V to 15 kV class equipment: Limited Approach (LA) is 5 feet, Restricted Approach (RA) is 2 feet, 2 inches, and Prohibited Approach (PA) is 7 inches.

The disclosed outputs 24, 78 output, for example, available fault current, incident energy and personnel protective equipment (PPE) level for a particular corresponding switchgear or power system based upon current conditions of the load or power system. Since these parameters are updated by the example motor starter 2 and/or by the example motor starters 74 and the example CDM 72, the information is current and correct based upon the last and/or worst case motor starting conditions. Furthermore, even if the load, switchgear or power system is modified, the calculated available fault current, the calculated incident energy and the calculated PPE level are current and up to date so that, for example, qualified or unqualified workers are notified of current and correct available fault current, incident energy and PPE level parameters.

The disclosed concept can be applied to medium voltage motor control centers (MCCs), to low voltage MCCs or to medium voltage switchgear. These normally have at least one relatively large motor starter for about 10% to about 15% of the load on the bus. The calculation of $I_{sc}$ increases in accuracy as the size of the motor increases with respect to the distribution system.

The disclosed motor starters can be circuit breaker or contactor based, and can be electrically connected by a common bus.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A protection relay for an electrical switching apparatus for a load, said protection relay comprising:
   a number of voltage sensors structured to sense voltage applied to said load;
   a number of current sensors structured to sense current flowing to said load;
   a processor cooperating with said number of voltage sensors and said number of current sensors, said processor being structured to control starting of said load and determine a fault current available at said load from: (i) the sensed current flowing to said load during said starting divided by (ii) a difference value divided by the sensed voltage before said starting, said difference value being the sensed voltage before said starting minus the sensed voltage during said starting; and
   an output cooperating with said processor, said output being structured to output the determined fault current and a number of: incident energy at said electrical switching apparatus, and a personal protective equipment level operatively associated with said electrical switching apparatus,
   wherein said processor is structured to determine from the determined fault current said number of: the incident energy at said electrical switching apparatus, and the personal protective equipment level operatively associated with said electrical switching apparatus.

2. The protection relay of claim 1 wherein said load is a motor; and wherein said protection relay is a motor protection relay.

3. The protection relay of claim 1 wherein said load is a motor; and wherein said protection relay forms part of a motor starter.

4. The protection relay of claim 1 wherein said protection relay is a medium voltage protection relay.

5. The protection relay of claim 1 wherein said protection relay is a three-phase protection relay.

6. The protection relay of claim 1 wherein said output is a display.

7. The protection relay of claim 6 wherein said display is structured to display the determined fault current, the incident energy at said electrical switching apparatus, the personal protective equipment level, and personal protective equipment required to be worn.

8. The protection relay of claim 1 wherein said output is structured to communicate with a communication network.

9. The protection relay of claim 1 wherein said processor is structured to determine the personal protective equipment level from a look-up table.

10. The protection relay of claim 1 wherein said output is an annunciator.

11. The protection relay of claim 1 wherein said fault current is available short circuit current.

12. An electrical switching apparatus for a load, said electrical switching apparatus comprising:
    a number of separable contacts;
    an operating mechanism structured to open and close said number of separable contacts;
    a number of voltage sensors structured to sense voltage applied to said load;
    a number of current sensors structured to sense current flowing through said number of separable contacts to said load;
    a processor cooperating with said number of voltage sensors and said number of current sensors, said processor being structured to control starting of said load and determine a fault current available at said load from: (i) the sensed current flowing to said load during said starting divided by (ii) a difference value divided by the sensed voltage before said starting, said difference value being the sensed voltage before said starting minus the sensed voltage during said starting; and
    a display cooperating with said processor, said display being structured to display the determined fault current and a number of: incident energy at said electrical switching apparatus, and a personal protective equipment level operatively associated with said electrical switching apparatus,
    wherein said processor is structured to determine from the determined fault current said number of: the incident energy at said electrical switching apparatus, and the personal protective equipment level operatively associated with said electrical switching apparatus.

13. The electrical switching apparatus of claim 12 wherein said electrical switching apparatus is a medium voltage electrical switching apparatus.

14. The electrical switching apparatus of claim 12 wherein said electrical switching apparatus is a three-phase electrical switching apparatus.

15. The electrical switching apparatus of claim 12 wherein said fault current is available short circuit current.

16. The electrical switching apparatus of claim 12 wherein said electrical switching apparatus is a motor starter; and wherein said load is a motor.

17. The electrical switching apparatus of claim 16 wherein said motor starter is a medium voltage motor starter.

18. The electrical switching apparatus of claim 16 wherein said motor starter is a three-phase motor starter.

19. The electrical switching apparatus of claim 16 wherein said fault current is available short circuit current.

20. A system comprising:
    an apparatus comprising:
    a processor, and
    an output;
    a number of controllers, each of said number of controllers comprising:
    a number of voltage sensors structured to sense voltage applied to a corresponding load,
    a number of current sensors structured to sense current flowing to said corresponding load, and
    another processor cooperating with said number of voltage sensors and said number of current sensors, said another processor being structured to control starting of said corresponding load and determine a fault current available at said corresponding load from: (i) the sensed current flowing to said corresponding load during said starting divided by (ii) a difference value divided by the sensed voltage before said starting, said difference value being the sensed voltage before said starting minus the sensed voltage during said starting; and a number of communication channels between said number of controllers and said apparatus, each of said number of communication channels being structured to communicate the determined fault current from a corresponding one of said number of controllers to said apparatus, wherein the processor of said apparatus is structured to determine from the determined fault current of one of said number of controllers a number of: incident energy at said one of said number of controllers, and a personal protective equipment level operatively associated with said one of said number of controllers, and wherein the output of said apparatus is structured to output the determined fault current of said one of said number of controllers and said number of: the incident energy at said one of said number of controllers, and the personal protective equipment level operatively associated with said one of said number of controllers.

21. The system of claim 20 wherein said number of controllers is a plurality of controllers; and wherein said number of communication channels is a communication network between said plurality of controllers and said apparatus.

22. The system of claim 20 wherein said number of controllers is a plurality of controllers; and wherein the processor of said apparatus is structured to determine a maximum fault current from the determined fault current of said plurality of controllers and to determine from the determined maximum fault current said number of: the incident energy at said one of said number of controllers, and the personal protective equipment level operatively associated with said one of said number of controllers.

23. An electrical switching apparatus for a load, said electrical switching apparatus comprising:

a number of separable contacts;

an operating mechanism structured to open and close said number of separable contacts;

a number of voltage sensors structured to sense voltage applied to said load;

a number of current sensors structured to sense current flowing through said number of separable contacts to said load;

a processor cooperating with said number of voltage sensors and said number of current sensors, said processor being structured to control starting of said load and determine a fault current available at said load from: (i) the sensed current flowing to said load during said starting divided by (ii) a difference value divided by the sensed voltage before said starting, said difference value being the sensed voltage before said starting minus the sensed voltage during said starting; and a display cooperating with said processor, said display being structured to display the determined fault current available at said load.

* * * * *